UNITED STATES PATENT OFFICE.

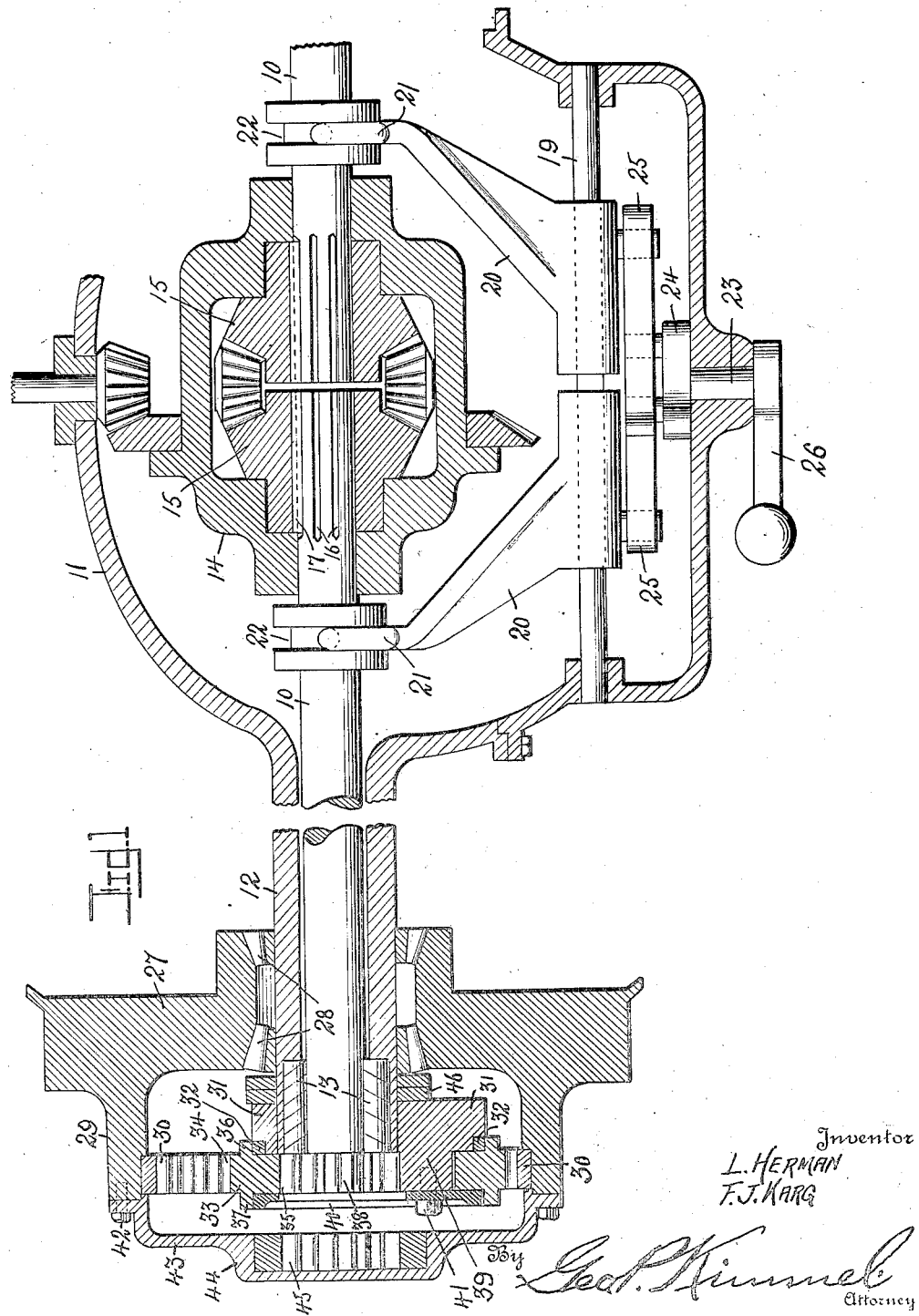

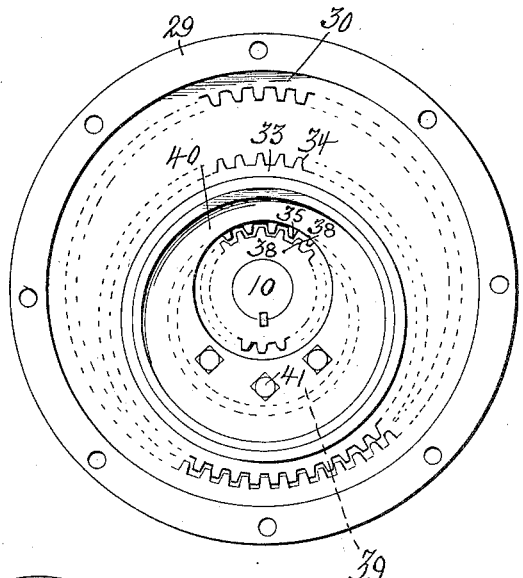
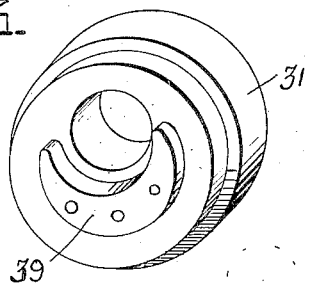
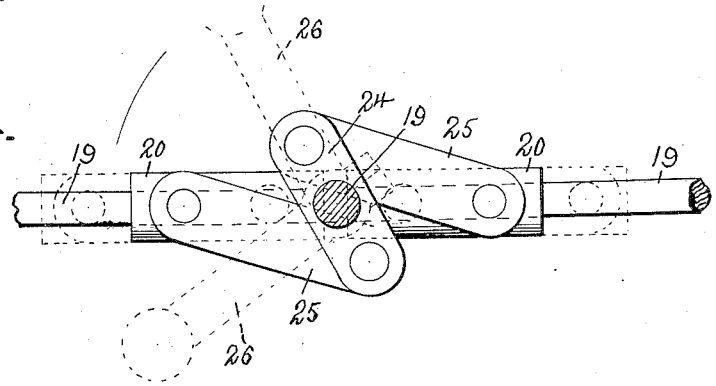

LEO HERMAN AND FRANK J. KARG, OF AKRON, OHIO.

CHANGE-SPEED GEARING.

1,358,547.  Specification of Letters Patent.  Patented Nov. 9, 1920.

Application filed May 21, 1920. Serial No. 383,129.

*To all whom it may concern:*

Be it known that we, LEO HERMAN and FRANK J. KARG, citizens of the United States, residing at Akron, in the county of Summit and State of Ohio, have invented certain new and useful Improvements in Change-Speed Gearing, of which the following is a specification.

This invention relates to the class of variable speed driving mechanisms, and has for one of its objects to simplify and improve the construction and increase the efficiency and utility of devices of this character.

Another object of the invention is to provide a device of this character which may be applied without material structural change to motor driven vehicles of various forms, and operative by electricity, gasolene, steam or other power.

Another object of the invention is to provide a device of this character whereby high or low speed may be transmitted to a wheel or other moving element from a drive shaft by simply actuating a shifter lever.

With these and other objects in view, the invention consists in certain novel features of construction as hereinafter shown and described and then specifically pointed out in the claims, and in the drawings illustrative of the preferred embodiment of the invention.

Figure 1 is a longitudinal sectional view of the improved apparatus.

Fig. 2 is an elevation of a portion of the speed changing gearing.

Fig. 3 is a detached perspective view of the support for the intermediate gear and the drive pinion.

Fig. 4 is a detail of the shaft shifting levers.

The improved device includes a two part shaft 10 mounted for rotation in longitudinal alinement within a suitable gear casing 11, and likewise slidable longitudinally therein. The casing 11 is extended at the ends into tubular portions 12 one only being shown, and with roller bearings 13.

At their inner ends the shaft sections 10 are supported in a differential gear, the differential gears being represented conventionally at 15.

It will be understood that one of the speed changing mechanisms will be associated with the outer end of each shaft section, but as these devices are alike except that certain parts are rights and lefts, one only is illustrated.

The confronting portions of the shaft sections 10 are formed with a plurality of marginal keyways 16 and the hub portions of the differential gears are each provided with keys, indicated at 17, to engage in the keyways. By this means the shaft sections are slidable in the hubs of the differential gearing while at the same time the shaft sections are constantly rotated by the differential gearing.

Mounted in the cover plate for the casing 11 is a rod 19, and slidable on the rod are shifting brackets 20, each including a forked portion 21 engaging respectively with channeled collars 22 fast to the shaft sections 10.

Mounted for rotation in the cover plate is a stub shaft 23, and connected intermediate its ends to the stub shaft within the casing is an arm 24, and pivotally connected to the arm 24 and to the brackets 20 are links 25.

Attached to the stub shaft 23 externally of the casing is an operating lever 26.

By this arrangement when the lever 26 is in one position, the arm 24 through the coaction of the links 25 and shifting brackets 20 will hold the shaft sections 10 in their inner positions, as shown in Fig. 1, and when the lever 26 is reversed in position the brackets will be likewise reversed and move the shaft sections into their outer positions.

The hub portion of a main motion transmitting wheel is represented at 27, and mounted for rotation by a suitable roller bearing 28 upon the tubular member 12. Extending from the wheel is an annular projection 29 having a ring gear 30 attached to its inner face. Mounted on the tubular member 12 externally of the wheel 27 is a holding member 31, the opening for the shaft being eccentrically disposed therein, as shown.

A bearing ring 32 engages in an annular shoulder in the member 31.

A double gear member including a body 33, outer gear teeth 34, and annular bearing flanges 36 and 37, is arranged within the ring gear with the flange 36 engaging over bearing ring 32. The outer gear teeth 34 are in constant engagement with the ring gear 30.

Attached to the outer ends of shaft sections 10 is a gear pinion 38 fitting, when the shaft sections are in their inner or withdrawn positions, within the eccentric opening in the member 31, and in engagement with the inner gear teeth 35 of the double gear.

Extending from the outer face of the member 31 is a crescent shaped projection 39, and bearing upon the crescent shaped projection and within the outer flange 37 of the double gear 33, is a holding plate 40 being held in place by clamp screws 41 tapped into the projection 39.

By this means the double gear is held in position for rotation upon the member 31.

The holding member 40 is provided with an opening to permit the pinion 38 to pass when the shaft sections are shifted.

Attached to the projection 29 of the wheel 27, by cap screws or studs 42 is a cap or cover member 43 having an internal central socket 44 in which an internal ring gear 45 is secured, the latter adapted to receive the pinion 38 when the shaft section 10 is projected outwardly by actuating the lever 26, the pinion 38 and gear 45 constituting a clutch to couple the shaft sections 10 to the wheel 27, and produce a direct rotation of the wheels from the shaft sections.

By this arrangement when the lever 26 is disposed in one position the shaft sections will be disposed in their inner or withdrawn positions and couple the pinions 38 with the gears 33 and thence to the gear 30 and the wheel 27 and produce the slow speed, and then by shifting the lever 26 to its other position the shaft sections are projected in opposite directions and the pinions 38 coupled to the gear members 45 and applying a direct drive to the wheels.

Bearing adjustment nuts 46 are preferably disposed between the holding member 31 and the hub of the wheel 27, as shown.

The improved device will be found very useful and efficient especially in motor trucks, as the direct drive can be employed when speed is required or when running upon level roads, and the indirect drive employed when greater power is required when moving up grades, or over uneven ground.

The device is simple in construction, can be inexpensively manufactured, and operates effectually for the purposes described.

The preferred embodiment of the invention is disclosed in the drawings and set forth in the specification, but it will be understood that any modifications within the scope of the claims may be made in the construction without departing from the principle of the invention or sacrificing any of its advantages.

What we claim is,

1. A device of the class described comprising a shaft mounted for rotation, a member rotative relative to the shaft and carrying an outer ring gear, a pinion upon said shaft, an intermediate ring gear having outer teeth engageable with the outer ring gear and internal teeth engageable with the pinion, a clutch element carried by the rotative member, and means for engaging the pinion with the clutch element.

2. A device of the class described, comprising a shaft mounted to be rotated and movable longitudinally, a member rotative relative to the shaft and having an annular projection, an outer ring gear attached to said projection, a pinion carried by said shaft, an intermediate ring gear having outer teeth engaging the outer ring gear and inner teeth engaged by said pinion when the shaft is in one of its longitudinal positions, and a clutch element attached to said rotative member and with which the pinion engages when the shaft is in its other longitudinal position.

3. A device of the class described comprising a shaft mounted for rotation and movable longitudinally, a sleeve inclosing the shaft, a member rotative on the sleeve and having an annular projection, an outer ring gear carried by the projection, a pinion carried by the shaft, a holding element carried by the sleeve, an inner ring gear rotative on the holding element and having outer teeth engaging the pinion when the shaft is in inner position, a clutch element carried by the annular projection of the rotative member and engaged by the pinion when the shaft is in outer position.

4. A device of the class described comprising a shaft mounted for rotation and movable longitudinally, a sleeve inclosing the shaft, a member rotative on the sleeve, an outer ring gear carried by the rotative member, a pinion carried by the shaft, a holding element carried by the sleeve, an inner ring gear rotative on the holding element and having outer teeth engaging the outer ring gear and inner teeth engaging the pinion when the shaft is in inner position, and a clutch element carried by the rotative member and engaged by the pinion when the shaft is in outer position.

5. A device of the class described comprising a shaft mounted for rotation and movable longitudinally, a sleeve inclosing the shaft, a member rotative on the sleeve, an outer ring gear carried by the rotative member, a pinion carried by the shaft, a holding element carried by the sleeve, an inner ring gear rotative on the holding element and having outer teeth engaging the outer ring gear and inner teeth engaging the pinion when the shaft is in inner position, a clamping member attached to the holding element and coacting therewith to rotatively support the inner ring gear, and a clutch element carried by the rotative member and engaged by the pinion when the shaft is in outer position.

6. In an apparatus of the class described, a shaft in coacting sections movable longitudinally, a differential gear device associated with said shaft sections, a member rotative relative to each of said shaft sections, means whereby the motion of the shaft is indirectly transmitted to the rotative member when the shaft is in one position, means for transmitting the motion of the shaft directly to the rotative member when the shaft is in another position, and means for adjusting the shaft sections.

7. In an apparatus of the class described, an inclosing casing, a shaft in coacting sections movable longitudinally in said casing, a differential gear device associated with said shaft sections, a member rotative relative to each of said shaft sections, means whereby the motion of the shaft is indirectly transmitted to the rotative member when the shaft is in one position, means for transmitting the motion of the shaft directly to the rotative member when the shaft is in another position, a stub shaft rotative in said cover plate casing, shifter bracket devices associated with said shaft sections, an arm carried by said stub shaft, and links connecting said arm with said bracket devices.

In testimony whereof, we affix our signatures hereto.

LEO HERMAN.
FRANK J. KARG.